United States Patent
Potdar et al.

(10) Patent No.: US 7,596,428 B2
(45) Date of Patent: Sep. 29, 2009

(54) METHODS AND APPARATUSES FOR MONITORING STEAM TURBINE VALVE ASSEMBLIES

(75) Inventors: Yogesh Kesrinath Potdar, Niskayuna, NY (US); David E. Welch, Amsterdam, NY (US); Chin-Penn Peter Chan, Mechanicville, NY (US); Guido Felice Forte, Jr., Rensselaer, NY (US)

(73) Assignee: General Electric Company, Schenectady, NY (US)

( * ) Notice: Subject to any disclaimer, the term of this patent is extended or adjusted under 35 U.S.C. 154(b) by 195 days.

(21) Appl. No.: 11/693,263

(22) Filed: Mar. 29, 2007

(65) Prior Publication Data

US 2008/0243287 A1 Oct. 2, 2008

(51) Int. Cl.
*G05B 13/00* (2006.01)

(52) U.S. Cl. .......................... 700/280; 700/52; 700/287

(58) Field of Classification Search ................ 700/108, 700/280, 287, 52; 702/127, 141, 182
See application file for complete search history.

(56) References Cited

U.S. PATENT DOCUMENTS

| | | | |
|---|---|---|---|
| 3,564,273 A * | 2/1971 | Cockrell | 290/40 R |
| 6,070,605 A | 6/2000 | Steenburgh | |
| 6,655,409 B1 | 12/2003 | Steenburgh et al. | |

* cited by examiner

*Primary Examiner*—Charles R Kasenge
(74) *Attorney, Agent, or Firm*—Sutherland Asbill & Brennan, LLP

(57) ABSTRACT

The present application provides for apparatuses and methods for monitoring steam turbine valve assemblies. In one embodiment of the present application a method for monitoring valve assemblies is provided. First, the vibration characteristics of at least one valve assembly prior to operation may be measured. Next, the behavior of that valve assembly may be monitored during operation of the valve assembly, then compared to the vibration characteristics determined prior to operation. Comparing the valve assembly behavior monitored during operation to the valve assembly characteristics measured prior to operation may allow for estimating the stress levels experienced by the valve assembly during operation.

16 Claims, 8 Drawing Sheets

METHODS AND APPARATUSES FOR MONITORING STEAM TURBINE VALVE ASSEMBLIES

TECHNICAL FIELD

The present application relates generally to a valve assembly, and more particularly relates to a method and a system for monitoring a valve assembly used in a steam turbine.

BACKGROUND OF THE INVENTION

A steam turbine converts the kinetic or thermal energy of pressurized steam into useful, mechanical energy. Generally, steam is created in a steam generator or boiler, then passes through stop and control valves into nozzles, which drive a rotor assembly. The rotor assembly may then in turn drive a generator to produce electrical energy. Stop valves and control valves control the operation of a steam turbine by controlling the flow of steam into the nozzles. A control valve typically controls steam entry into the nozzles during normal operation levels. A stop valve is typically held open during normal operation and closed when immediate shut-down is necessary. In some applications, the control valve and stop valve are integrated into a single unit.

At various operating levels, flow characteristics in and around the valve assemblies of a steam turbine may cause instabilities that may lead to vibration. Excessive vibration is undesirable and may lead to component fatigue and premature failure of the valve assemblies. It is known that valve assemblies in use during operation exhibit vibration characteristics arising from vibration of the valve assemblies themselves, as well as from the flow in and around the valve assemblies, often referred to by structural vibration and acoustic vibration, respectively. The valve assemblies may be impacted by the individual vibration effects, as well as the interaction between the structural and acoustic frequencies and modal shapes.

The current solution to correct vibration frequency interaction is to design valve assemblies that are predicted to achieve sufficient separation between their structural and acoustical characteristics. However, as the number of applications in which valve assemblies may be used increases, their operating conditions become less predictable. Further, the demand on valve assemblies is increasing, causing them to operate in harsher, more varied conditions. Accordingly, providing adequate separation between structural and acoustical vibration characteristics is becoming increasingly more difficult, thereby preventing full awareness of the stresses placed on the valve assemblies and, therefore, the fatigue experienced.

There is a desire, therefore, to better understand the vibration characteristics of valve assemblies used in steam turbines. Further, it is preferable to gain an understanding of the vibration characteristics of the valve assemblies during various operational states for use in comparison with vibration characteristics of valve assemblies while in use.

BRIEF DESCRIPTION OF THE INVENTION

The present application thus provides for apparatuses and methods for monitoring steam turbine valve assemblies. In one embodiment of the present application, a method for monitoring valve assemblies is provided. First, the vibration characteristics of at least one valve assembly prior to operation may be measured. Next, the behavior of that valve assembly may be monitored during operation of the valve assembly, then compared to the vibration characteristics determined prior to operation. Comparing the valve assembly behavior monitored during operation to the valve assembly characteristics measured prior to operation may allow for estimating the stress levels experienced by the valve assembly during operation.

In another embodiment, a system may be provided to monitor steam turbine valve assemblies. The system may include at least one characteristic analyzer coupled to at least one valve assembly, wherein the characteristic analyzer or analyzers may be programmed to measure the vibration characteristics of the valve assembly prior to operation and store the vibration characteristics in a memory. At least one monitoring device may be coupled to the valve assembly for monitoring behavior of the valve assembly during operation. At least one control unit may be coupled to the monitoring device or monitoring devices, wherein the control unit is programmed to: receive monitored behavior of the valve assembly from the monitoring device, retrieve the vibration characteristics from the memory, compare the behavior monitored during operation to the vibration characteristics measured prior to operation, and estimate stress levels experienced by the valve assembly during operation based on the comparison of the behavior during operation to the vibration characteristics prior to operation.

In yet a further embodiment, a method for monitoring at least one valve assembly used in a steam turbine is provided. First, the baseline characteristics of the valve assembly may be measured in a plurality of operating conditions prior to operation. Measuring baseline characteristics may include: measuring the natural vibration frequencies of the acoustic space and the structure of the valve assembly, determining vibration pressure distributions and vibration pressure amplitudes exerted on the valve assembly for at least one of the natural vibration frequencies, performing a forced response analysis on the one valve assembly, wherein the forced response analysis may include considering the vibration pressure distribution and the vibration pressure amplitude. The behavior of the valve assembly may be monitored during operation, wherein the behavior includes vibration frequencies of the valve assembly, the vibration amplitudes of the valve assembly, the valve lift of the valve assembly, steam pressures, and steam temperatures. Then, the behavior during operation of the valve assembly may be compared to the baseline characteristics of the valve assembly. This method may allow for predicting a remaining useful life of the valve assembly based on the comparison of the behavior during operation to the baseline characteristics.

These and other features of the present application will become apparent to one of ordinary skill in the art upon review of the following detailed description when taken in conjunction with the several drawings and the appended claims.

DETAILED DESCRIPTION OF THE INVENTION

Figure 1:
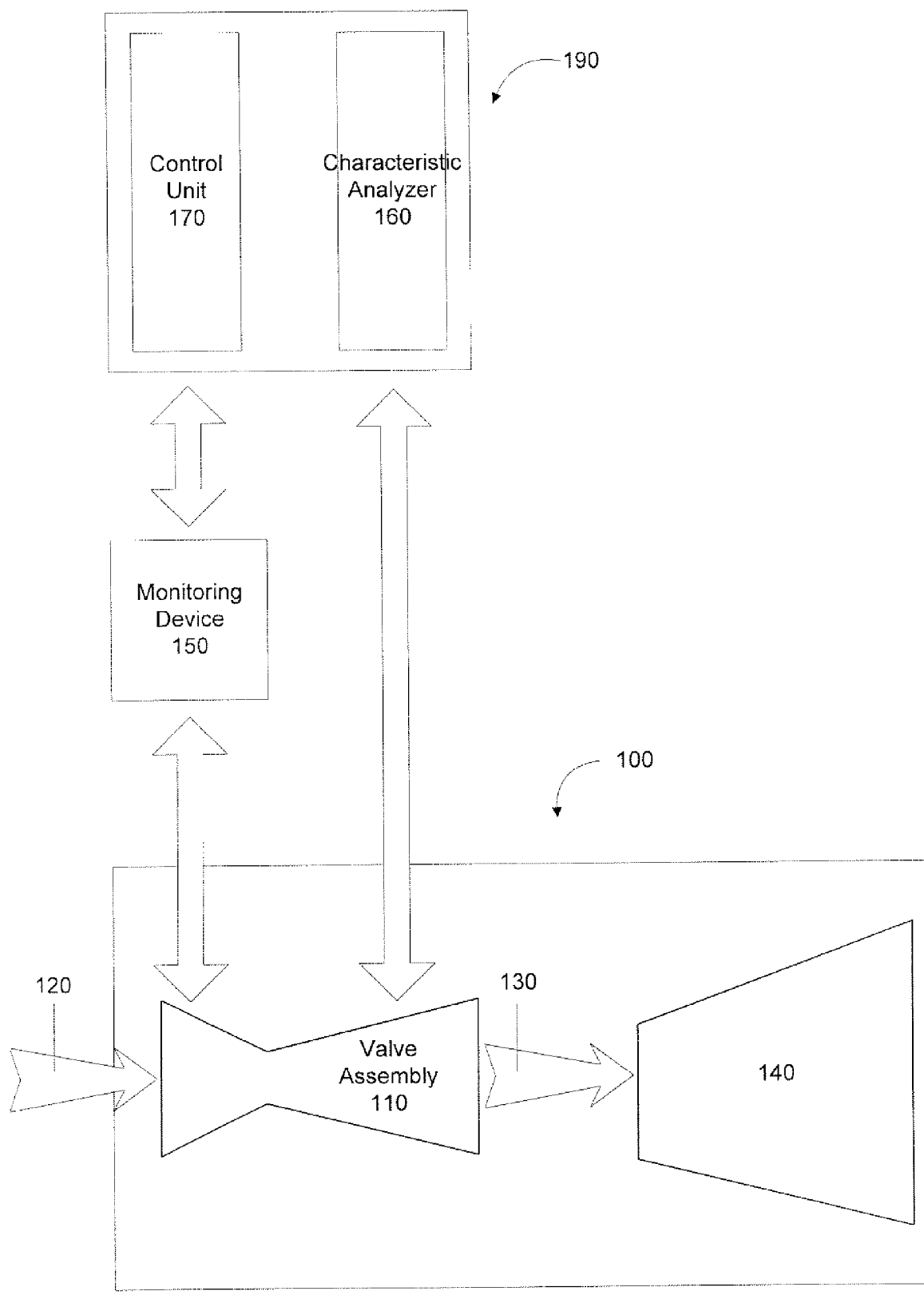
FIG. 1 is a block diagram of the system for monitoring valve assemblies.

The present application now will be described more fully hereinafter with reference to the accompanying drawings, in which some, but not all embodiments are shown. Indeed, the subject matter of the present application may be embodied in many different forms and should not be construed as limited to the embodiments set forth herein; rather, these embodiments are provided so that this disclosure will satisfy applicable legal requirements. Like numbers refer to like elements throughout.

The present application references block diagrams of systems, methods, apparatuses, and computer program products according to at least one embodiment described herein. It will be understood that each block of the block diagrams, and combinations of blocks in the block diagrams, respectively, can be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

The systems and methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network. Exemplary embodiments will hereinafter be described with reference to the figures, in which like numerals indicate like elements throughout the several drawings.

According to an aspect of the present application, the impact of fatigue, and more specifically high cycle fatigue, on steam turbine valve assemblies may be determined. These systems and methods may be used to determine baseline characteristics of the vibration effects on a valve assembly structure and the related acoustic space. The baseline may be used for comparison to monitored behavior exhibited by the valve assemblies during operation. Accordingly, the combination of understanding baseline characteristics and the behavior exhibited by the valve assemblies during operation allows the system to better inform operators as to the stresses placed on the valve assemblies and, thus, wear and estimated time to failure of the valve assemblies.

FIG. 1 illustrates, by way of a block diagram, a steam turbine 100 in a steam turbine system. Steam may enter the steam turbine 100 by way of one or more steam inlets 120, which connect to a valve assembly 110 that controls the entry and volume of steam entering one or more rotor assemblies 140 by way of one or more steam outlets 130. The valve assembly 110 may include a control valve and a stop valve in a single assembly. Alternatively, the control valve and stop valve may reside in separate assemblies. The valve assembly 110 controls the flow of steam. If the valve assembly 110 is open, then steam will be allowed to flow through to the rotor assembly 140. Alternatively, if the valve assembly 110 is closed, steam will not be permitted to flow through to the rotor assembly 140. It is appreciated that the steam turbine 100 may contain more than one of the components being described herein. For example, multiple valve assemblies 110 may be configured so as to operate in series or in parallel with each other, and/or they may be configured to operate in full-arc or partial-arc admission.

Figure 3:
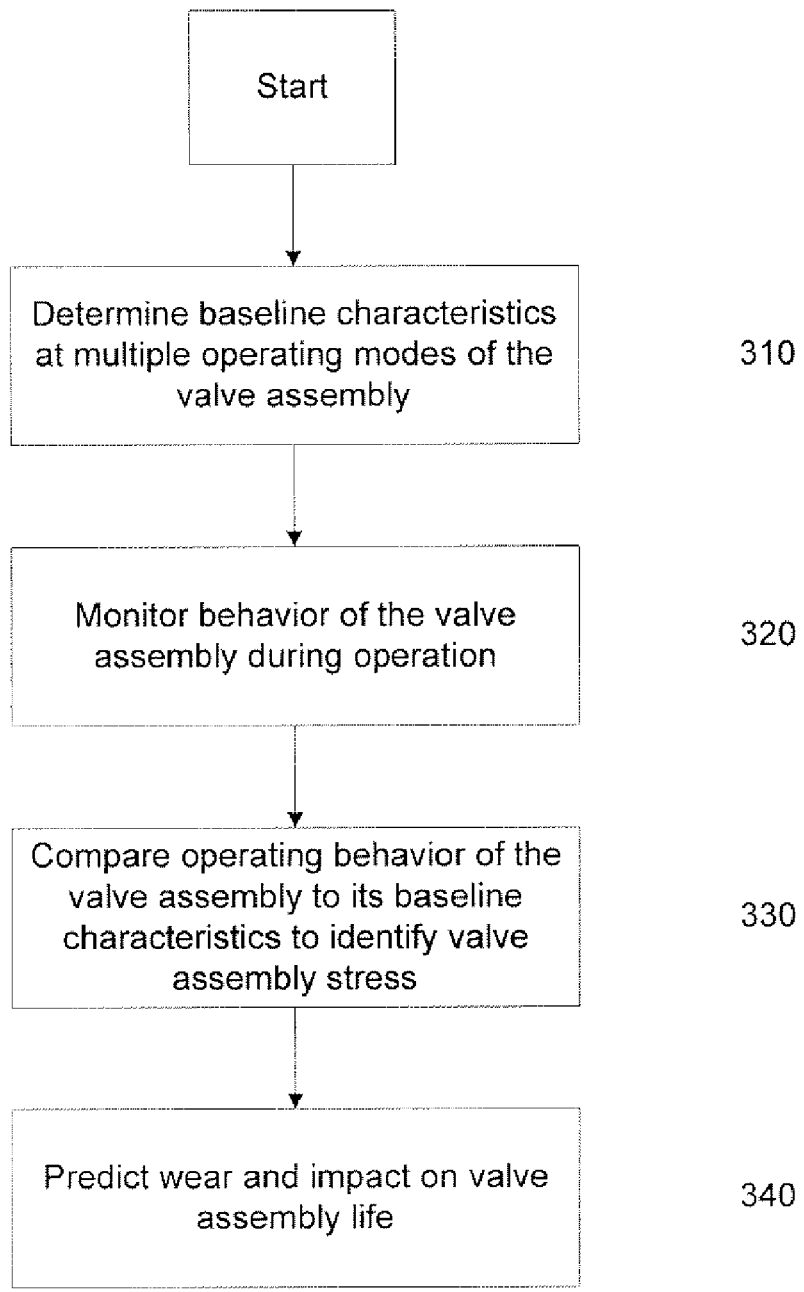
FIG. 3 is an exemplary flowchart illustrating logic implemented by the system of FIG. 1.
Figure 4:
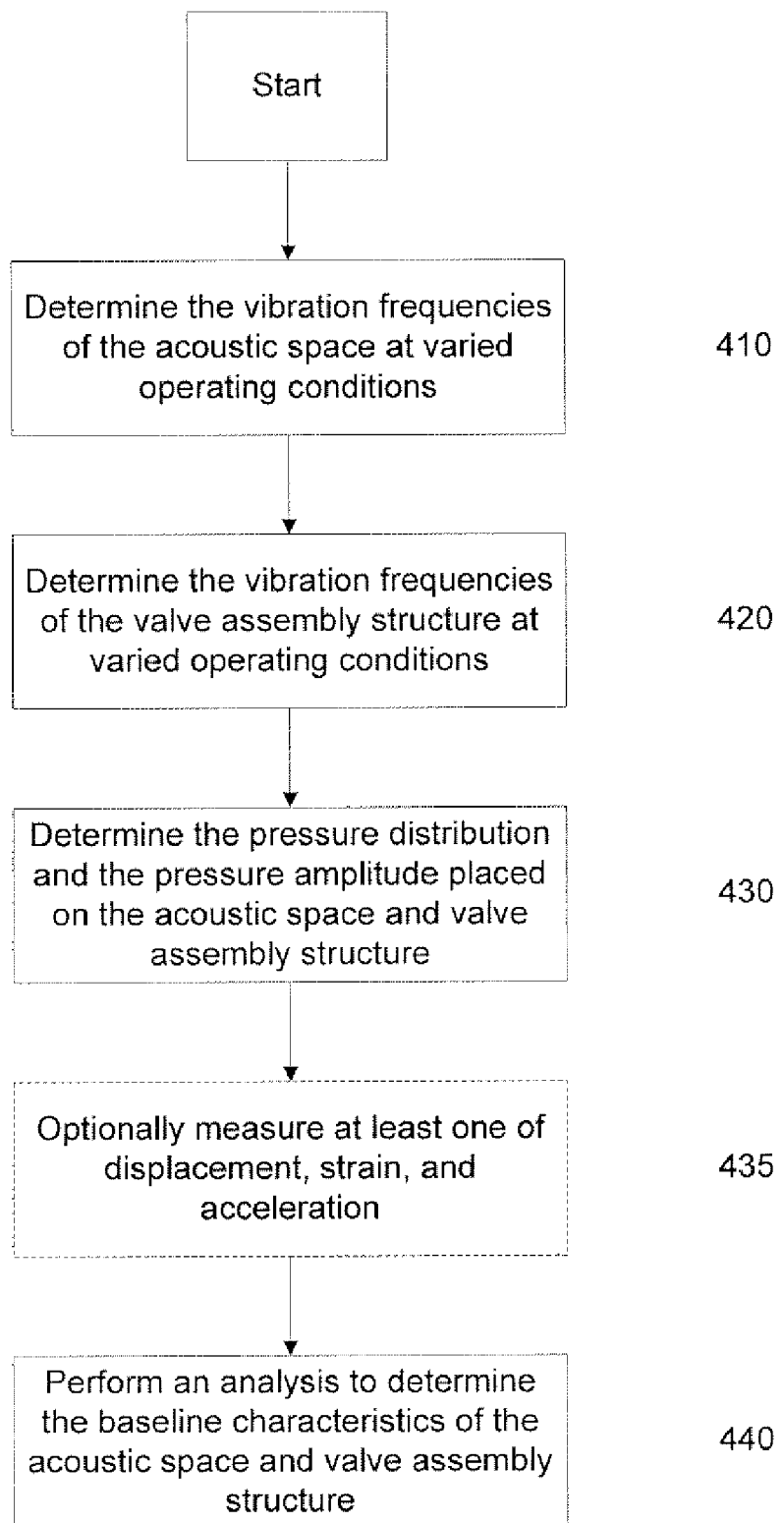
FIG. 4 is an exemplary flowchart illustrating logic implemented by the system of FIG. 1.
Figure 5:
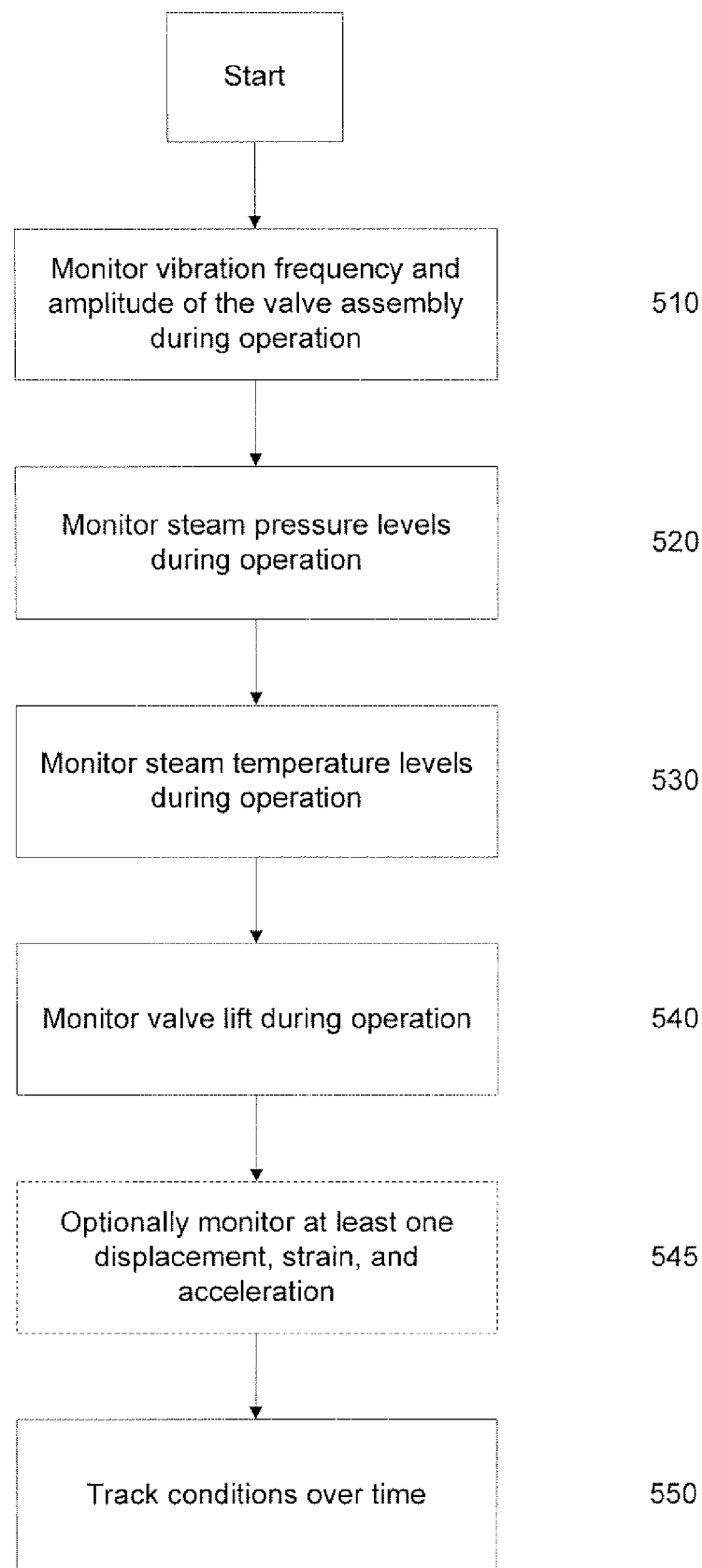
FIG. 5 is an exemplary flowchart illustrating logic implemented by the system of FIG. 1.

One or more monitoring devices 150 may integrate with the valve assembly 110 to allow monitoring of various parameters of the valve assembly 110. For example, one of the monitoring devices 150 may be an accelerometer used to measure vibration characteristics of the valve assembly 110, such as amplitude and frequency. Another example of one of the monitoring devices 150 may be a strain gauge or a dynamic strain gauge used to measure the strain caused to the valve assembly 110. Also, other examples of parameters monitored by the monitoring devices 150 may include steam pressure, steam temperature, valve lift, displacement, strain, acceleration, or operation time. It should be appreciated by those skilled in the art that operating parameters of the steam turbine 100 other than those mentioned herein may be monitored by the monitoring devices 150. The descriptions accompanying FIGS. 3 and 5 provide further detail regarding the operation of the control unit 170 and the monitoring devices 150. One or more run-time control units 170 may receive, store, and process measurement data from the monitoring devices 150. One or more characteristic analyzers 160 may be used to obtain valve assembly 110 characteristics before being put into operation. For example, the characteristic analyzer 160 may include the capabilities of performing finite element analyses, unsteady computational fluid dynamic analyses, as well as other field or lab tests as are known in the art. The descriptions accompanying FIGS. 3 and 4 provide further detail regarding the operation of the characteristic analyzer 160. Finally, the control unit 170 and the characteristic analyzer 160 may be run on one or more computerized monitoring systems 190. The description accompanying FIG. 2 provides further detail regarding the operation of the computerized monitoring system 190.

Figure 2:
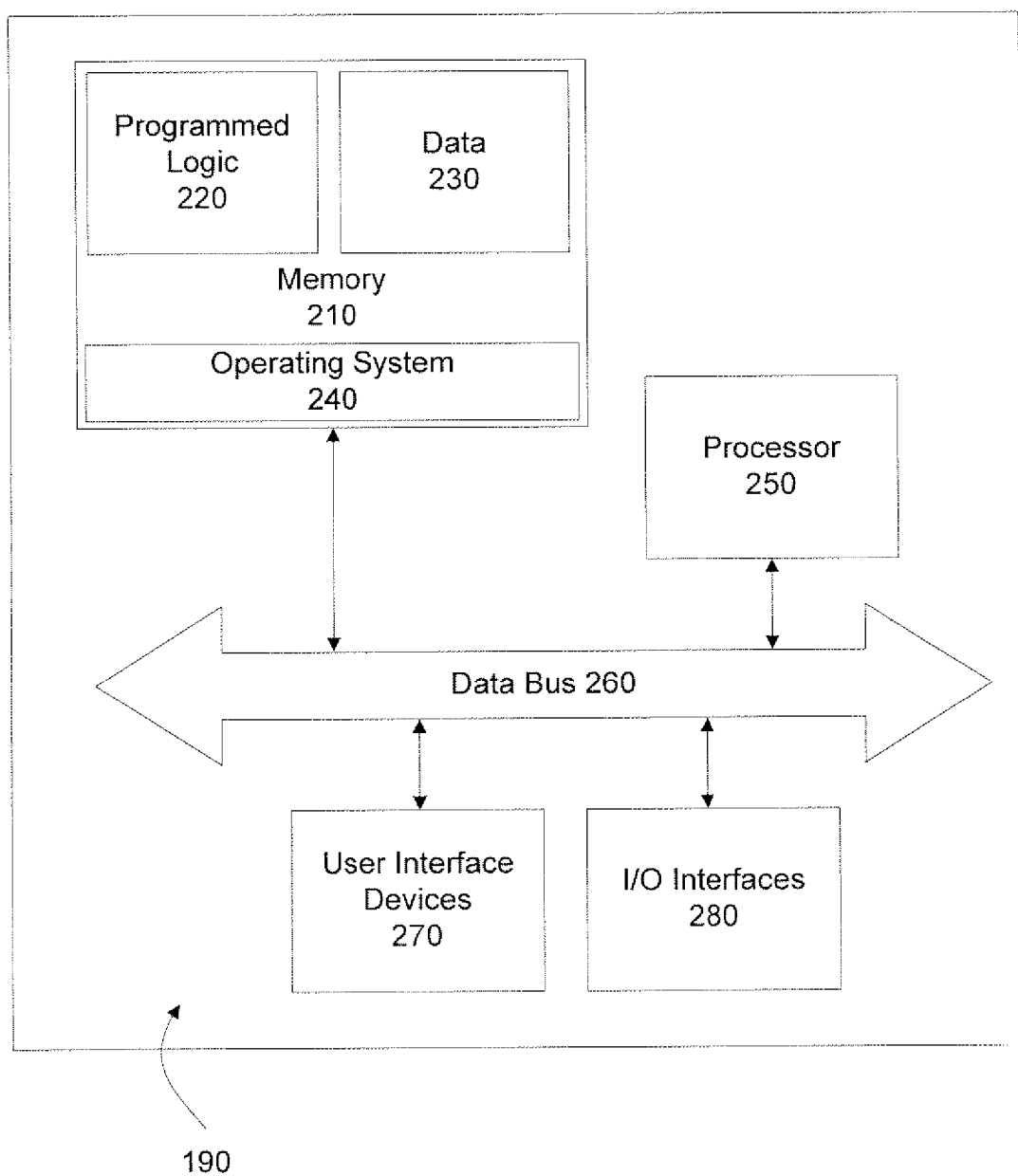
FIG. 2 is a block diagram of a computerized monitoring system used by the system of FIG. 1.

FIG. 2 shows a block diagram of the computerized monitoring system 190 used for characterizing and monitoring the valve assemblies 110, according to an illustrative embodiment of the present application. More specifically, the elements of the computerized monitoring system 190 may be used to execute the functions of the control unit 170 and the characteristic analyzer 160. The computerized monitoring system 190 may include a memory 210 that stores programmed logic 220 (e.g., software) and may store measurement data 230. The memory 210 also may include an operating system 240. A processor 250 may utilize the operating system 240 to execute the programmed logic 220, and in doing so, also may utilize the measurement data 230. A data bus 260 may provide communication between the memory 210 and the processor 250. Users may interface with the computerized monitoring system 190 via a user interface device(s) 270 such as a keyboard, mouse, control panel, or any other devices capable of communicating data to and from the computerized monitoring system 190. For example, the user interface device 270 may display a signal to the user that a threshold vibration level has been exceeded during operation of the steam turbine 100. The user interface device may also display to the user the estimated consumed life or remaining life of the valve assembly 110. The computerized monitoring system 190 may be in communication with the steam turbine 100, as well as in communication with the valve assemblies 110 prior to integration with the steam turbine 100, via an I/O Interface 280. More specifically, one or more of the computerized monitoring systems 190 may carry out the execution of the control unit 170, such as monitoring the valve assembly 110 via the monitoring device or devices 150. Also, one or more of the computerized monitoring systems 190 may also carry out the execution of characteristic analyzer 160 prior to steam turbine 100 operation. Additionally, it should be appreciated that other external devices, such as the rotor assembly 140 or multiple other steam turbines 100, may be in communication with the computerized monitoring system 190 via the I/O Interface 240. In the illustrated embodiment, the computerized monitoring system 190 may be located remotely with respect to the steam turbine 100, though it may be co-located or even integrated with the steam turbine 100. Further the computerized monitoring system 190 and the programmed logic 220 implemented thereby may comprise software, hardware, firmware or any combination thereof. It should also be appreciated that multiple computerized monitoring systems 190 may be used, whereby different features described herein may be executed on one or more different computerized monitoring systems 190.

FIGS. 3-5 are exemplary flowcharts illustrating the methods by which an embodiment of the present application may operate. FIG. 3 is an exemplary flowchart of the basic operation of the characteristic analyzer 160 and the control unit 170 used to determine the baseline characteristics and operating behavior of the valve assembly 110, according to an illustrative embodiment of the present application. At block 310, the characteristic analyzer 160 may determine the baseline characteristics of the valve assembly 110 at one or more operating states. The operating states analyzed by the characteristic analyzer 160 may be, for example, cold start-up, hot start-up, warm start-up, load transferring, and shut-down.

As described above, it should be appreciated that the characteristic analyzer 160 may run on one or more computerized monitoring systems 190 and may include one or more program modules stored as the programmed logic 220 in the memory 210. These program modules may be used during analysis at block 310, such as program modules able to perform finite element analyses, unsteady computational fluid dynamics ("unsteady CFD"), or other lab or field tests known in the art. The operation of and methods implemented by the characteristic analyzer 160 are more fully detailed in the description accompanying FIG. 4.

After the baseline characteristics have been determined, the valve assembly 110 may be monitored during operation in the steam turbine 100, as indicated by block 320, using the one or more monitoring devices 150 in communication with the control unit 170, as described in reference to FIG. 1. The operation of and methods implemented by the control unit 170 are more fully detailed in the description accompanying FIG. 5.

At block 330, the operating behavior measured by the control unit 170 may be compared to the baseline characteristics determined by the characteristic analyzer 160 at block 310 to identify the stresses placed on the valve assembly 110 during operation. More specifically, the operating behavior, such as the acceleration and frequency data measured at block 320, and the acoustic stimulus identified by the baseline characteristics at block 310 allow predicting, via numerical algorithms, the operating vibration amplitudes and thus stresses to which the valve assembly 110 was exposed to during operation.

Finally, as shown in block 340, understanding the potential effects on the valve assembly 110 may allow operators to predict the undesirable effects of high cycle fatigue. More specifically, the operating stresses estimated at block 330 may then be analyzed to compute the consumed life of the valve assembly 110 during the operation recorded. Consumed life may be calculated using Miner's Rule, or other stress predicting techniques, such as probabilistic distributions like logarithmical distributions, Weibull distributions, or others commonly known in the art. The consumed life may then be stored in the memory 210 for later reference and operation. Further, the consumed life calculations may be added together cumulatively to arrive at a measurement of total consumed life as well as estimating the remaining viable life of the valve assembly 110. The determinations made at block 340 may be made in real-time, quasi-real-time, or may be made based primarily on historic data.

FIG. 4 is an exemplary flowchart of the steps which may be taken by the characteristic analyzer 160 to determine the baseline characteristics of the valve assembly 110 at one or more operating states, according to an aspect of the present application. The baseline characteristics may be determined prior to operation, typically in a bench test or lab environment, although field tests or the like, as are known in the art, may be used to determine the characteristics described in FIG. 4. Further, the baseline characteristics may be determined for, but not limited to, the following operating states: cold start-up, hot start-up, warm start-up, load transferring, and shut-down. Notwithstanding these operating state examples, it is appreciated that the systems and methods described herein do not require measuring the entire spectrum of operating states to achieve adequate baseline measurements. Additionally, it is appreciated that each of the measurements described in reference to FIG. 4 do not have to be taken to arrive at a sufficient understanding of the baseline characteristics and, therefore, a subset of the measurements described is sufficient for gaining a baseline understanding.

At block 410 the natural vibration frequencies of the acoustic space of the valve assembly 110 may be measured for one or more operating states. The acoustic space may best be defined as the interior cavity of the valve assembly 110 through which steam passes during operation. More specifically, the natural vibration frequencies of the acoustic space may be determined using a validated numerical analysis. This typically includes performing, for example, a finite element analysis wherein the geometry of the acoustic space is modeled and acoustic frequencies and normalized pressure distributions are determined using commercially available finite element analysis tools. The goal of this step is to more accurately understand the frequencies of the acoustic space surrounding the control valve within the valve assembly 110. Further, it is appreciated that several other numerical methods, for example, the boundary element method, actual experimental measurement techniques such as putting microphones in the space, or the like as is known in the art, may be used to accomplish this goal. Accordingly, the possible structural modes that may be excited may be predicted up to a certain frequency, for example 10 kHz.

At block 420, the natural vibration frequencies of the valve assembly 110 structure may be determined at one or more operating states. The natural vibration frequencies may be measured using measuring devices similar to monitoring device 150, such as an accelerometer. Measuring both the acoustic characteristics and the structure characteristics allow identification of possible acoustic-structure vibration interaction, which may substantially affect the stresses experienced by the valve assembly 110 and assist one to predict its remaining life.

Figure 7:
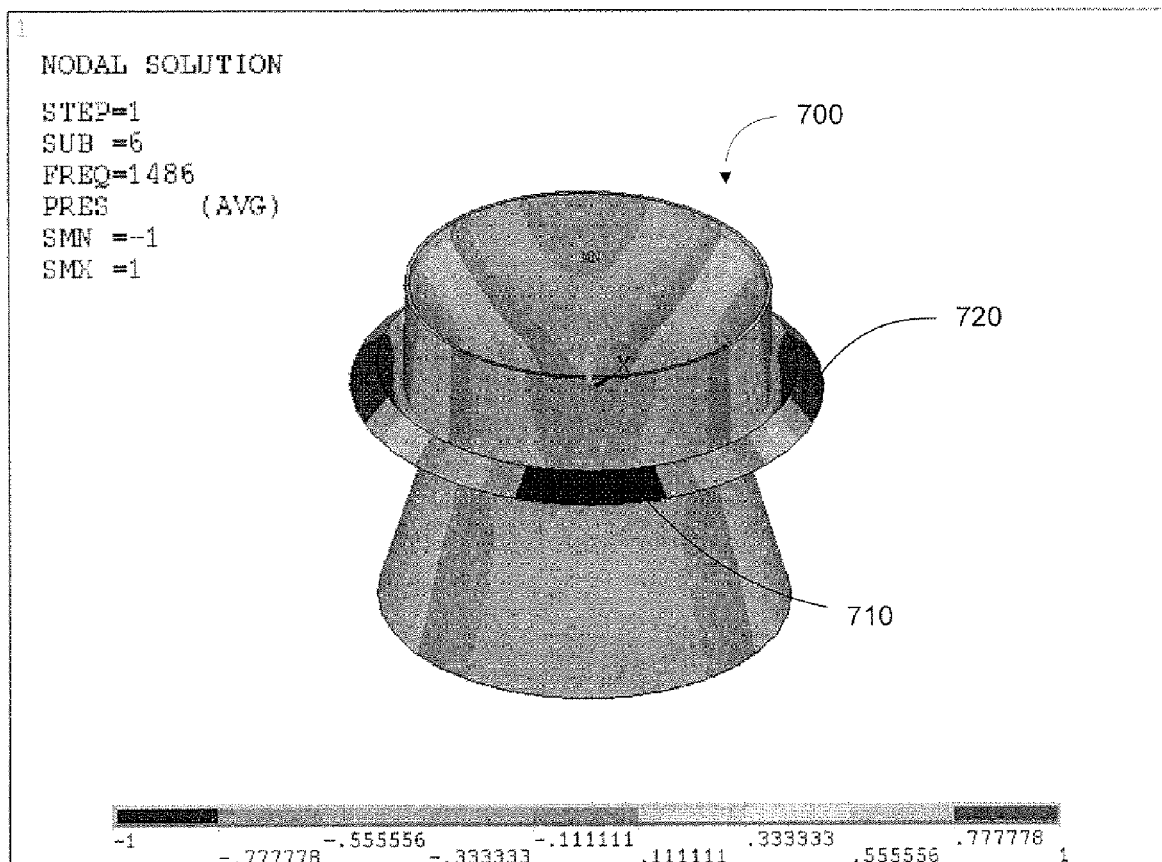
FIG. 7 is an exemplary output from the system of FIG. 1.

As is shown in block 430, the amplitude and distribution of the pressure placed on the acoustic space and the structure of the valve assembly 110 may be determined. For example, unsteady CFD analyses or other lab tests or field tests, as are known in the art, may be used to identify the pressure distribution and relative amplitudes in block 430. FIG. 7, discussed in more detail below, illustrates an exemplary output of an unsteady CFD analysis performed on the valve assembly 110 at a specific frequency, mode, and operating state.

Figure 8:
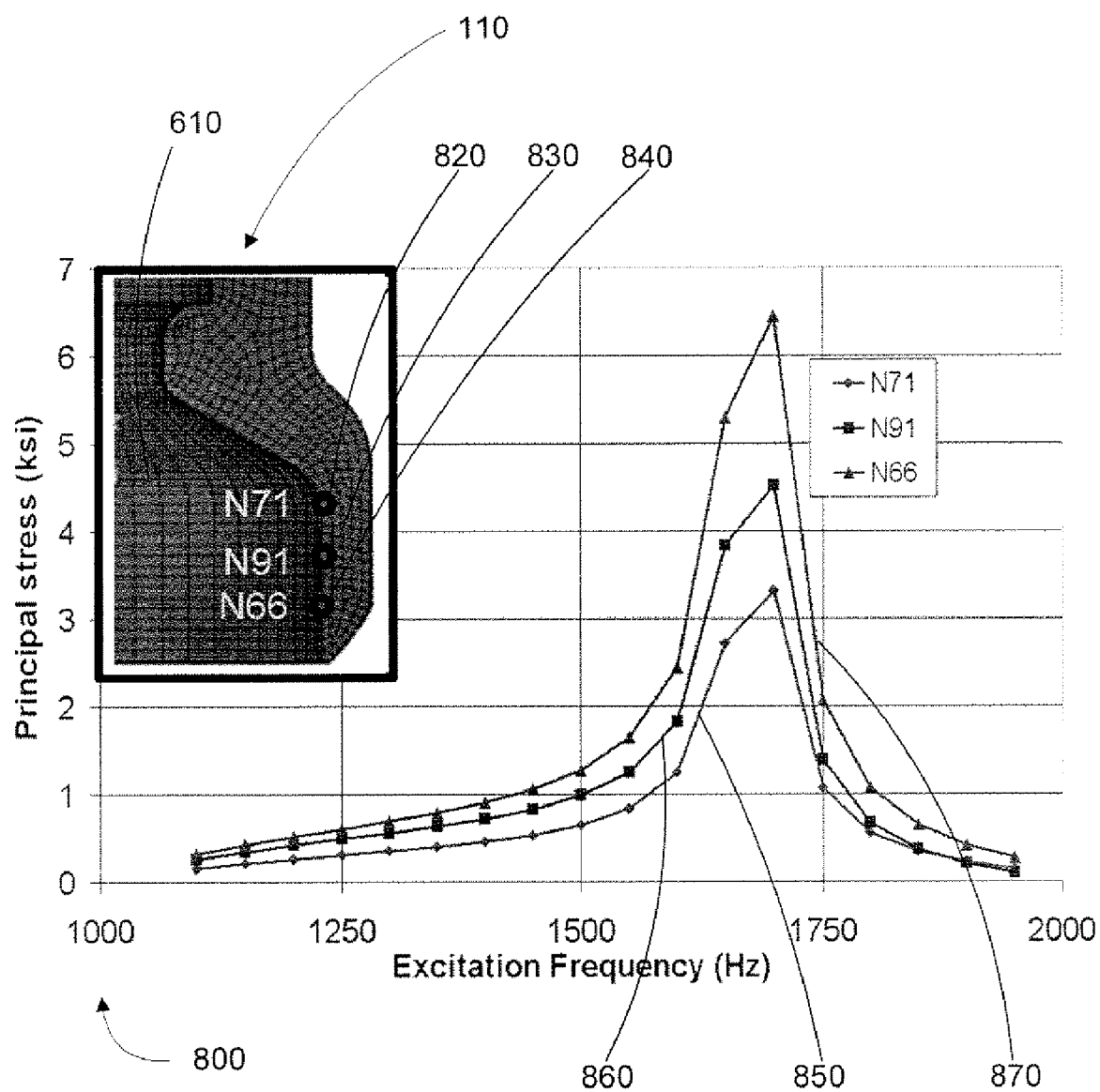
FIG. 8 is an exemplary output from the system of FIG. 2.

The pressure distribution and amplitudes as determined at block 430 may then be provided as inputs to the forced response analysis described at block 440. A forced response analysis may be a finite element analysis procedure, whereby the stress response may be determined at points on the valve assembly 110 for differing operating frequencies. FIG. 8, discussed in more detail below, illustrates exemplary output of a forced response analysis for sample locations on the valve assembly 110. The measured stress response amplitudes determined at block 440 may be used for comparison to the valve assembly 110 operating behavior measured at block 320 of FIG. 3 and more fully discussed in the above discussion of blocks 330 and 340 of FIG. 3.

As shown at block 435, at least one of displacement, strain, and acceleration of the valve assembly 110 may optionally be measured prior to operation to gain further characterization of the baseline operation of the valve assembly 110. Strain may be measured using a monitoring device 150 such as a strain gauge a dynamic strain gauge, or the like, as is known in the art. Acceleration may be measured using a monitoring device 150 such as an accelerometer, or the like, as is known in the art. Displacement may be measured using a combination of the measurements taken from a strain gauge and an accelerometer, from a dynamic strain gauge, or the like, as is known in the art. It is appreciated that taking these measurements is optional at this step and not necessary to perform the subject matter disclosed in this application.

FIG. 5 is an exemplary flowchart of the steps which may be taken by the control unit 170 to monitor the valve assembly 110 during operation in the steam turbine 100. At block 510, the vibration frequency and relative amplitude of the valve assembly 110 during operation may be monitored. More specifically, one or more monitoring devices 150, such as an accelerometer or the like as are commonly known in the art, may be attached to the valve assembly 110 and in communication with the control unit 170. The control unit 170 may include software that reads signals provided by the monitoring devices 150 and translates the signals into vibration frequencies and relative amplitudes. At block 520, steam pressure levels surrounding the valve assembly 110 may be monitored using a pressure sensing device as is known in the art. At block 530, steam temperature levels surrounding the valve assembly 110 may be monitored using a temperature sensing device as is known in the art. The valve lift of the valve assembly 110 may be measured by a linear variable displacement transducer, or other by other methods commonly known in the art, as described at block 540.

All of the above conditions may be measured and tracked over time, as described at block 550. Tracking these conditions over time provides a more complete picture as to how long the valve assembly 110 was subjected to the varied conditions. Furthermore, tracking the operating conditions of the valve assembly 110 over time allows for estimating the consumed life of the device, as described at block 340 in FIG. 3. It should be appreciated that the conditions described above are only for exemplary purposes and that it will be apparent to one having skill in the art that other conditions may be measured and included in the analysis of the valve assembly 110 operational behavior. For example, as shown at block 545, at least one of stress, strain, and displacement may optionally be monitored during operation for subsequent comparison to the baseline measurements as optionally measured at block 435 in FIG. 4.

Figure 6:
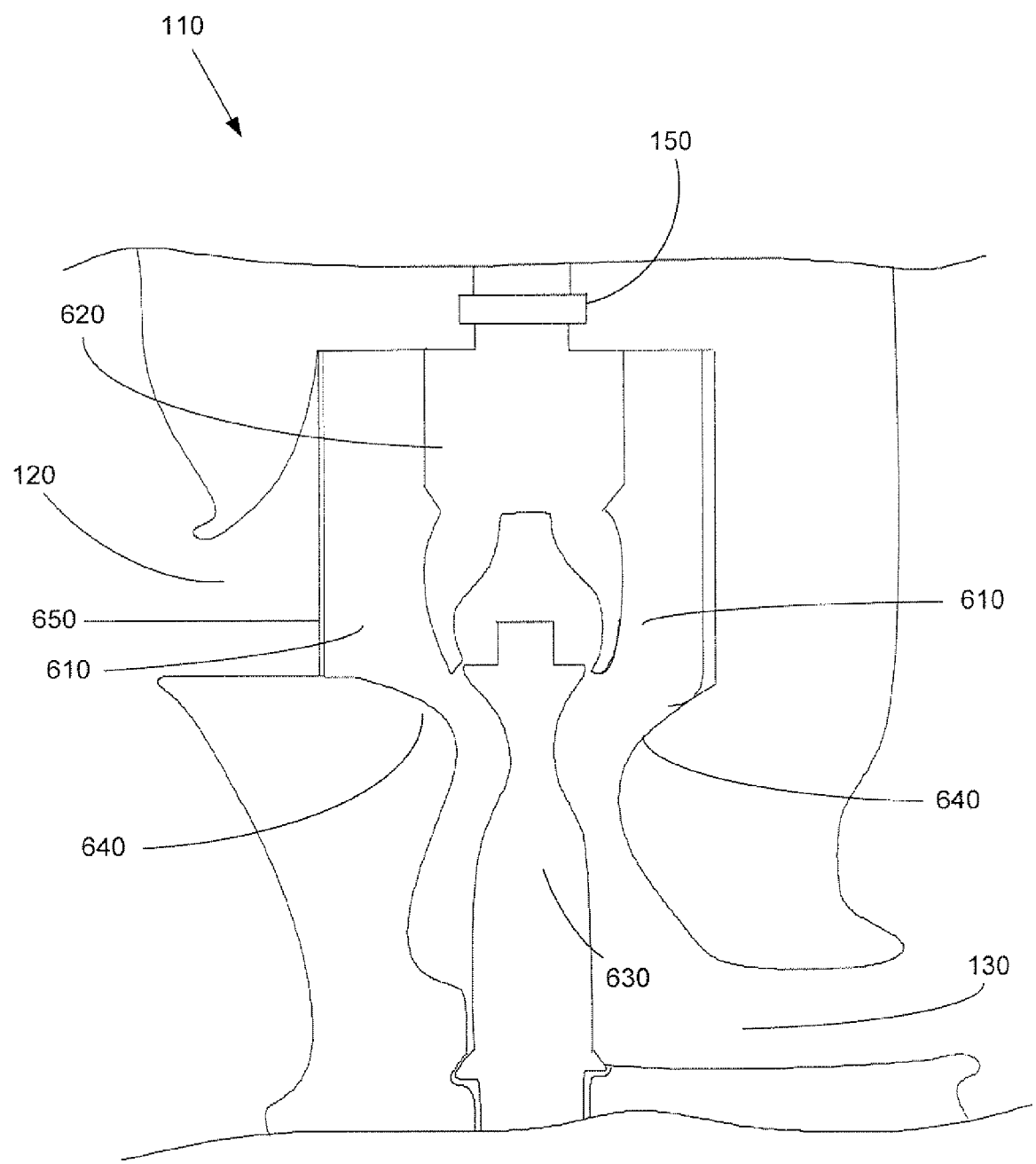
FIG. 6 is a partial cross-section illustration of an exemplary valve assembly of FIG. 1.

FIG. 6 shows an illustrative example of the valve assembly 110 that may be monitored during practice of the present methods and systems described herein. The acoustic space 610 identifies the interior cavity of the valve assembly 110. In this exemplary valve assembly, a control valve 620 and a stop valve 630 are integrated into a single unit. During operation, the control valve 620 may be held open so as to allow flow from the steam inlet 120, through an annular screen 650, through the acoustic space 610, to the steam outlet 130. The flow rates may be controlled by the proximity of the bottom of the control valve 620 to the valve seat 640, whereby seating the control valve 620 against the valve seat stop the flow. Furthermore, to immediately stop the flow, the stop valve 630 may be rapidly seated against the valve seat 640. The interaction between the vibration characteristics of the acoustic space 610 and the valve assembly 110, including the control valve 620, and the stop valve 630, may impact the overall behavior of the valve assembly 110. The monitoring device 150, such as an accelerometer, may be placed on the valve stem of the control valve 620, for example, to monitor operational behavior of the control valve. Similarly, though not shown, a monitoring device 150 may be placed on the valve stem of the stop valve 630 to monitor its operational behavior.

FIG. 7 shows an illustrative example of a normalized pressure distribution as may be determined using an unsteady CFD analysis, like at block 430 of FIG. 4. An acoustic space model 700 is provided of an exemplary valve assembly 110. The graphical output of an unsteady CFD analysis shows a gradient of normalized pressure distributions grading from a negative normalized pressure 710 to a positive normalized pressure 720. The shaded areas shown on the acoustic space model 700 represent different normalized pressure distribution gradients having relative values less than the greatest pressure, represented by the positive normalized pressure 720, and greater than the slightest pressure, represented by the negative normalized pressure 710.

FIG. 8 shows an illustrative example of the results of the forced response analysis that may be performed in block 440 of FIG. 4 to model the stress that may be placed on the valve assembly 110. An exemplary acoustic space 610 and valve assembly 110 is shown having sample locations a first location 820, a second location 830, and a third location 840 for which the pressure response may be measured. The forced response analysis output 800 graphs the principal stress in kilo-pounds per square inch on the y-axis and the excitation frequency in Hertz on x-axis. Exemplary output is shown by a first output 850, a second output 860, and a third output 870 corresponding to the stress caused on the valve assembly 110 at the first, second, and third locations 820, 830, 840 over the frequencies between 1000 Hertz and 2000 Hertz. It is appreciated that the acoustic space, the locations for which the stress is shown, the frequencies over which the stress is measured, and the magnitudes of stresses depicted in analysis output 800 is for illustrative purposes only and may differ with the structure and application of the valve assembly.

It should be apparent that the foregoing relates only to the preferred embodiments of the present application and that numerous changes and modifications may be made herein by one of ordinary skill in the art without departing from the general spirit and scope defined by the following claims and the equivalents thereof.

We claim:

1. A method for monitoring valve assemblies, comprising:
   measuring vibration characteristics of at least one valve assembly prior to operation;
   monitoring behavior of said at least one valve assembly during operation, wherein said monitoring behavior comprises:
   (a) measuring vibration frequencies of said at least one valve assembly,
   (b) measuring vibration amplitudes of said at least one valve assembly,
   (c) measuring at least one of: a valve lift of said at least one valve assembly, steam pressures, steam temperatures, displacement, strain, or acceleration, and
   (d) storing in a memory said monitored behavior, including a duration over which said measurements are taken;
   comparing said behavior of said at least one valve assembly during operation to said vibration characteristics of said at least one valve assembly;
   estimating stress levels experienced by said at least one valve assembly during operation based on the comparison of said behavior during operation to said vibration characteristics prior to operation;
   wherein each of the comparing and estimating operations are performed by at least one of: at least one control unit or at least one characteristic analyzer.

2. The method in claim 1, wherein said measuring vibration frequencies and said measuring vibration amplitudes are performed using an accelerometer.

3. A method for monitoring valve assemblies, comprising:
   measuring vibration characteristics of at least one valve assembly prior to operation;
   monitoring behavior of said at least one valve assembly during operation;
   comparing said behavior of said at least one valve assembly during operation to said vibration characteristics of said at least one valve assembly; and
   estimating stress levels experienced by said at least one valve assembly during operation based on the comparison of said behavior during operation to said vibration characteristics prior to operation;
   calculating a consumed life of said at least one valve assembly considering said estimated stress levels experienced by said at least one valve assembly during operation; and
   storing said consumed life in a memory;
   wherein each of the comparing, estimating, and calculating operations is performed by at least one of: at least one control unit or at least one characteristic analyzer.

4. The method in claim 3, further comprising calculating a consumed life using Miner's Rule.

5. The method in claim 3, further comprising:
   adding cumulatively said consumed life to estimate a remaining useful life of said at least one valve assembly; and
   displaying to at least one user said remaining useful life.

6. A method for monitoring valve assemblies, comprising:
   measuring vibration characteristics of a plurality of operating conditions of at least one valve assembly prior to operation;
   monitoring behavior of said at least one valve assembly during operation;
   comparing said behavior of said at least one valve assembly during operation to said vibration characteristics of said at least one valve assembly;
   estimating stress levels experienced by said at least one valve assembly during operation based on the comparison of said behavior during operation to said vibration characteristics prior to operation;
   determining natural vibration frequencies of an acoustic space of said at least one valve assembly;
   determining natural vibration modes of the acoustic space of said at least one valve assembly;
   determining natural vibration frequencies of a structure of said at least one valve assembly;
   determining natural vibration modes of the structure of said at least one valve assembly;
   determining pressure distributions placed on the structure of said at least one valve assembly for at least one of said natural vibration frequencies;
   determining pressure amplitudes placed on the structure of said at least one valve assembly for at least one of said natural vibration frequencies; and
   performing a forced response analysis to determine relative stress levels experienced by at least one location on said at least one valve assembly, wherein said forced response analysis at least partially considers said pressure amplitudes and said pressure distributions;
   wherein each of the estimating, determining, and performing operations is performed by at least one of: at least one control unit or at least one characteristic analyzer.

7. The method in claim 6, wherein said measuring vibration characteristics further comprises determining at least one of: displacement of said at least one valve assembly, strain on said at least one valve assembly, or acceleration of said at least one valve assembly.

8. The method in claim 6, wherein said determining said natural vibration frequencies and said natural vibration modes of the acoustic space is performed using pressure sensitive microphones and wherein said determining said natural vibration frequencies and said natural vibration modes of the structure is performed using an accelerometer.

9. The method in claim 6, wherein said determining pressure distributions and said determining pressure amplitudes comprise performing an unsteady computational fluid dynamics analysis.

10. A system for monitoring valve assemblies, comprising:
    at least one characteristic analyzer coupled to at least one valve assembly, wherein said at least one characteristic analyzer is programmed to measure vibration characteristics of said at least one valve assembly prior to operation and store said vibration characteristics in a memory;

at least one monitoring device coupled to said at least one valve assembly for monitoring behavior of said at least one valve assembly during operation; and at least one control unit coupled to said at least one monitoring device, wherein said at least one control unit is programmed to:
receive monitored behavior of said at least one valve assembly from said monitoring device;
measure vibration frequencies of said at least one valve assembly and vibration amplitudes of said at least one valve assembly;
measure at least one of: a valve lift of said at least one valve assembly, steam pressures, steam temperatures, displacement, strain, or acceleration;
store said monitored behavior and said measurements, including a duration over which said measurements are taken, in the memory;
retrieve said vibration characteristics from said memory;
compare said monitored behavior to said measured vibration characteristics of said at least one valve assembly; and
estimate stress levels experienced by said at least one valve assembly during operation based on said comparison of said behavior during operation to said vibration characteristics prior to operation.

11. A system for monitoring valve assemblies, comprising:
at least one characteristic analyzer coupled to at least one valve assembly, wherein said at least one characteristic analyzer is programmed to measure vibration characteristics of said at least one valve assembly prior to operation and store said vibration characteristics in a memory;
at least one monitoring device coupled to said at least one valve assembly for monitoring behavior of said at least one valve assembly during operation; and
at least one control unit coupled to said at least one monitoring device, wherein said at least one control unit is programmed to:
receive monitored behavior of said at least one valve assembly from said monitoring device;
retrieve said vibration characteristics from said memory;
compare said monitored behavior to said measured vibration characteristics of said at least one valve assembly;
estimate stress levels experienced by said at least one valve assembly during operation based on said comparison of said behavior during operation to said vibration characteristics prior to operation;
calculate a consumed life of said at least one valve assembly considering said estimated stress levels placed on said at least one valve assembly during operation; and
store said consumed life in the memory.

12. The system in claim 11, wherein said at least one control unit:
adds cumulatively said consumed life to estimate a remaining useful life of said at least one valve assembly; and
displays to at least one user said remaining useful life.

13. A system for monitoring valve assemblies, comprising:
at least one characteristic analyzer coupled to at least one valve assembly, wherein said at least one characteristic analyzer is programmed to measure vibration characteristics of said at least one valve assembly prior to operation and store said vibration characteristics in a memory, and further programmed to:
determine natural vibration frequencies of an acoustic space of said at least one valve assembly;
determine natural vibration modes of the acoustic space of said at least one valve assembly;
determine natural vibration frequencies of a structure of said at least one valve assembly;
determine natural vibration modes of the structure of said at least one valve assembly;
determine pressure distributions placed on the structure of said at least one valve assembly for at least one of said natural vibration frequencies;
determine pressure amplitudes placed on the structure of said at least one valve assembly for at least one of said natural vibration frequencies; and
perform a forced response analysis to determine relative stress levels experienced by at least one location on said at least one valve assembly, wherein said forced response analysis considers said pressure amplitudes and said pressure distributions;

at least one monitoring device coupled to said at least one valve assembly for monitoring behavior of said at least one valve assembly during operation; and
at least one control unit coupled to said at least one monitoring device, wherein said at least one control unit is programmed to:
receive monitored behavior of said at least one valve assembly from said monitoring device;
retrieve said vibration characteristics from said memory;
compare said monitored behavior to said measured vibration characteristics of said at least one valve assembly; and
estimate stress levels experienced by said at least one valve assembly during operation based on said comparison of said behavior during operation to said vibration characteristics prior to operation.

14. The system in claim 13, wherein said pressure distributions and said pressure amplitudes are determined by performing an unsteady computational fluid dynamics analysis.

15. The system in claim 13, wherein said at least one characteristic analyzer determines at least one of: displacement of said at least one valve assembly, strain on said at least one valve assembly, or acceleration of said at least one valve assembly.

16. A method for monitoring at least one valve assembly used in a steam turbine, comprising:
measuring baseline characteristics of said at least one valve assembly in a plurality of operating conditions prior to operation, wherein said measuring baseline characteristics further comprises:
measuring natural vibration frequencies of an acoustic space and a structure of said at least one valve assembly;
determining vibration pressure distributions and vibration pressure amplitudes exerted on said at least one valve assembly for at least one of said natural vibration frequencies;
performing a forced response analysis on said at least one valve assembly, wherein said forced response analysis comprises considering said vibration pressure distributions and said vibration pressure amplitudes;
monitoring a behavior during operation of said at least one valve assembly, wherein said behavior comprises vibration frequencies of said at least one valve assembly, vibration amplitudes of said at least one valve assembly, a valve lift of said at least one valve assembly, steam pressures, and steam temperatures;

comparing said behavior during operation of said at least one valve assembly to said baseline characteristics of said at least one valve assembly; and predicting a remaining useful life of said at least one valve assembly based on said comparison of said behavior during operation to said baseline characteristics;

wherein each of the determining, performing, comparing, and predicting operations are performed by at least one of: at least one control unit or at least one characteristic analyzer.

* * * * *